United States Patent
Hari

(10) Patent No.: US 10,789,089 B2
(45) Date of Patent: Sep. 29, 2020

(54) DYNAMIC APPLICATION MIGRATION BETWEEN CLOUD PROVIDERS

(71) Applicant: Ravi Hari, Bangalore (IN)

(72) Inventor: Ravi Hari, Bangalore (IN)

(73) Assignee: Intuit Inc., Mountain View, CA (US)

( * ) Notice: Subject to any disclaimer, the term of this patent is extended or adjusted under 35 U.S.C. 154(b) by 155 days.

(21) Appl. No.: 16/130,131

(22) Filed: Sep. 13, 2018

(65) Prior Publication Data

US 2020/0089515 A1 Mar. 19, 2020

(51) Int. Cl.
| | | |
|---|---|---|
| G06F 9/455 | (2018.01) | |
| G06F 9/48 | (2006.01) | |
| H04L 29/12 | (2006.01) | |
| H04L 12/24 | (2006.01) | |
| G06N 3/02 | (2006.01) | |

(52) U.S. Cl.
CPC ........ *G06F 9/45558* (2013.01); *G06F 9/4856* (2013.01); *G06N 3/02* (2013.01); *H04L 41/0813* (2013.01); *H04L 41/5009* (2013.01); *H04L 41/5029* (2013.01); *H04L 61/3025* (2013.01); *G06F 2009/4557* (2013.01)

(58) Field of Classification Search
CPC ..... G06F 9/45558; G06F 9/4856; G06N 3/02; H04L 41/0813; H04L 41/5009; H04L 41/5029; H04L 61/3025
See application file for complete search history.

(56) References Cited

U.S. PATENT DOCUMENTS

| | | | |
|---|---|---|---|
| 10,191,778 B1 * | 1/2019 | Yang | G06F 9/45558 |
| 10,375,169 B1 * | 8/2019 | Diallo | G06F 11/0751 |
| 2020/0004569 A1 * | 1/2020 | Gupta | G06F 9/45558 |
| 2020/0026538 A1 * | 1/2020 | Cui | G06F 11/203 |

OTHER PUBLICATIONS

Moawad, Assaad, "Neural networks and back-propagation explained in a simple way" <https://medium.com/datathings/neural-networks-and-backpropagation-explained-in-a-simple-way-f540a3611f5e>; Feb. 1, 2018 (13 pages).

(Continued)

*Primary Examiner* — Diem K Cao
(74) *Attorney, Agent, or Firm* — Ferguson Braswell Fraser Kubasta PC

(57) ABSTRACT

A method that involves receiving budget information of a containerized application deployed with a set of containers to a first cloud provider service of a set of cloud provider services; receiving pricing information from each cloud provider service of the set of cloud provider services, wherein the set of cloud provider services includes the first cloud provider service and a second cloud provider service; receiving performance information of the containerized application from the first cloud provider service; generating an output vector from a machine learning model, wherein the machine learning model uses the pricing information and the performance information to generate the output vector; determining a first cloud provider service cost and a second cloud provider service cost based on the output vector and the pricing information; migrating the containerized application from the first cloud provider service to the second cloud provider service.

17 Claims, 9 Drawing Sheets

(56) References Cited

OTHER PUBLICATIONS

AWS Documentation, Amazon EC2 Auto Scaling, User Guide, What is Amazon EC2 Auto Scaling?, <https://docs.aws.amazon.com/autoscaling/ec2/userguide/what-is-amazon-ec2-auto-scaling.html>; Accessed Sep. 12, 2018 (3 pages).
Yusuke Sugomori et al., "Deep Learning: Practical Neural Networks with Java"; Chapter 2; Jun. 2017 (25 pages).
Sebastian Raschka et al., Python Machine Learning; Second Edition; Chapter 2; Sep. 2017 (24 pages).
Phil Kim, "MATLAB Deep Learning: With Machine Learning, Neural Networks and Artificial Intelligence"; Chapters 3-4; Jun. 15, 2017 (26 pages).

* cited by examiner

|  | 522 | 524 | 526 | 528 | 530 | 532 | 534 | 536 | 538 | 540 | 542 |
|---|---|---|---|---|---|---|---|---|---|---|---|
| 502 |  | i1 | i2 | i3 | i4 | i5 | i6 | o1 | o2 | o3 | c1 |
| 504 |  | Pricing % | Processor % | Memory % | Storage % | Latency % | Traffic % | Type 1 | Type 2 | Type 3 | Cost % |
| 506 | cps1 | 0.000 | 0.140 | 0.098 | 0.163 | 0.706 | 0.000 | 0 | 0 | 0 | 1.080 |
| 508 | cps2 | 0.356 | 0.966 | 0.072 | 0.193 | 0.119 | 1.000 | 0 | 0 | 1 | 1.094 |
| 510 | cps3 | 0.013 | 0.757 | 0.708 | 0.188 | 0.695 | 0.995 | 0 | 1 | 1 | 1.062 |
| 512 | cps4 | 0.661 | 1.000 | 0.000 | 0.000 | 1.000 | 0.234 | 1 | 1 | 0 | 0.964 |
| 514 | cps1 | 0.891 | 0.000 | 1.000 | 0.956 | 0.043 | 0.794 | 1 | 1 | 0 | 0.963 |
| 516 | cps2 | 0.425 | 0.181 | 0.202 | 0.761 | 0.847 | 0.169 | 0 | 1 | 0 | 1.040 |
| 518 | cps3 | 1.000 | 0.919 | 0.970 | 0.741 | 0.000 | 0.656 | 1 | 1 | 0 | 0.980 |
| 520 | cps4 | 0.824 | 0.851 | 0.765 | 1.000 | 0.912 | 0.739 | 1 | 1 | 1 | 0.925 |

Table 500

DYNAMIC APPLICATION MIGRATION BETWEEN CLOUD PROVIDERS

BACKGROUND

Cloud provider services provide on-demand delivery of compute power, database, storage, applications, and other information technology resources via the internet, with pay-as-you-go pricing. Cloud provider services can provide individual services or groups of services and can dynamically scale to meet the needs of the application based on input from the developer.

Running containerized applications in a cloud infrastructure from a cloud provider entails a cost assessed by the cloud provider. Different cloud providers can offer different pricing models that can be more suitable with on-demand pricing, spot instances, reserved instances, dedicated hosts, etc. Prices can also vary based on the region of the cloud infrastructure in which an application operates. A challenge is to determine the most suitable cloud provider for deployment of a containerized application.

SUMMARY

In general, in one or more aspects, the invention relates to a method that involves receiving budget information of a containerized application deployed with a set of containers to a first cloud provider service of a set of cloud provider services; receiving pricing information from each cloud provider service of the set of cloud provider services, wherein the set of cloud provider services includes the first cloud provider service and a second cloud provider service; receiving performance information of the containerized application from the first cloud provider service; generating an output vector from a machine learning model, wherein the machine learning model uses the pricing information and the performance information to generate the output vector; determining a first cloud provider service cost and a second cloud provider service cost based on the output vector and the pricing information; migrating the containerized application from the first cloud provider service to the second cloud provider service based on the output vector, the first cloud provider service cost, and the second cloud provider service cost by removing a first container from the first cloud provider service and deploying a second container to the second cloud provider service, wherein the first container and the second container each perform a same function.

In general, in one aspect, embodiments are related to a system that comprises a memory coupled to a processor; a migration service that executes on the processor, uses the memory, and is configured for: receiving budget information of a containerized application deployed with a set of containers to a set of machine instances to a first cloud provider service of a set of cloud provider services; receiving pricing information from each cloud provider service of the set of cloud provider services, wherein the set of cloud provider services includes the first cloud provider service and a second cloud provider service; receiving performance information of the containerized application from the first cloud provider service; generating an output vector from a machine learning model, wherein the machine learning model uses the pricing information and the performance information to generate the output vector; and migrating the containerized application from the first cloud provider service to the second cloud provider service based on the output vector by removing a first container from the first cloud provider service and deploying a second container to the second cloud provider service, wherein the first container and the second container each perform a same function.

In general, in one aspect, embodiments are related to a non-transitory computer readable medium with computer readable program code for receiving budget information of a containerized application deployed with a set of containers to a first cloud provider service of a set of cloud provider services; receiving pricing information from each cloud provider service of the set of cloud provider services, wherein the set of cloud provider services includes the first cloud provider service and a second cloud provider service; receiving performance information of the containerized application from the first cloud provider service; generating an output vector from a machine learning model, wherein the machine learning model uses the pricing information and the performance information to generate the output vector; determining a first cloud provider service cost and a second cloud provider service cost based on the output vector and the pricing information; and migrating the containerized application from the first cloud provider service to the second cloud provider service based on the output vector, the first cloud provider service cost, and the second cloud provider service cost by removing a first container from the first cloud provider service and deploying a second container to the second cloud provider service, wherein the first container and the second container each perform a same function.

Other aspects of the invention will be apparent from the following description and the appended claims.

BRIEF DESCRIPTION OF DRAWINGS

FIG. 5 shows example output of a system in accordance with one or more embodiments of the invention.

DETAILED DESCRIPTION

Figure 1:
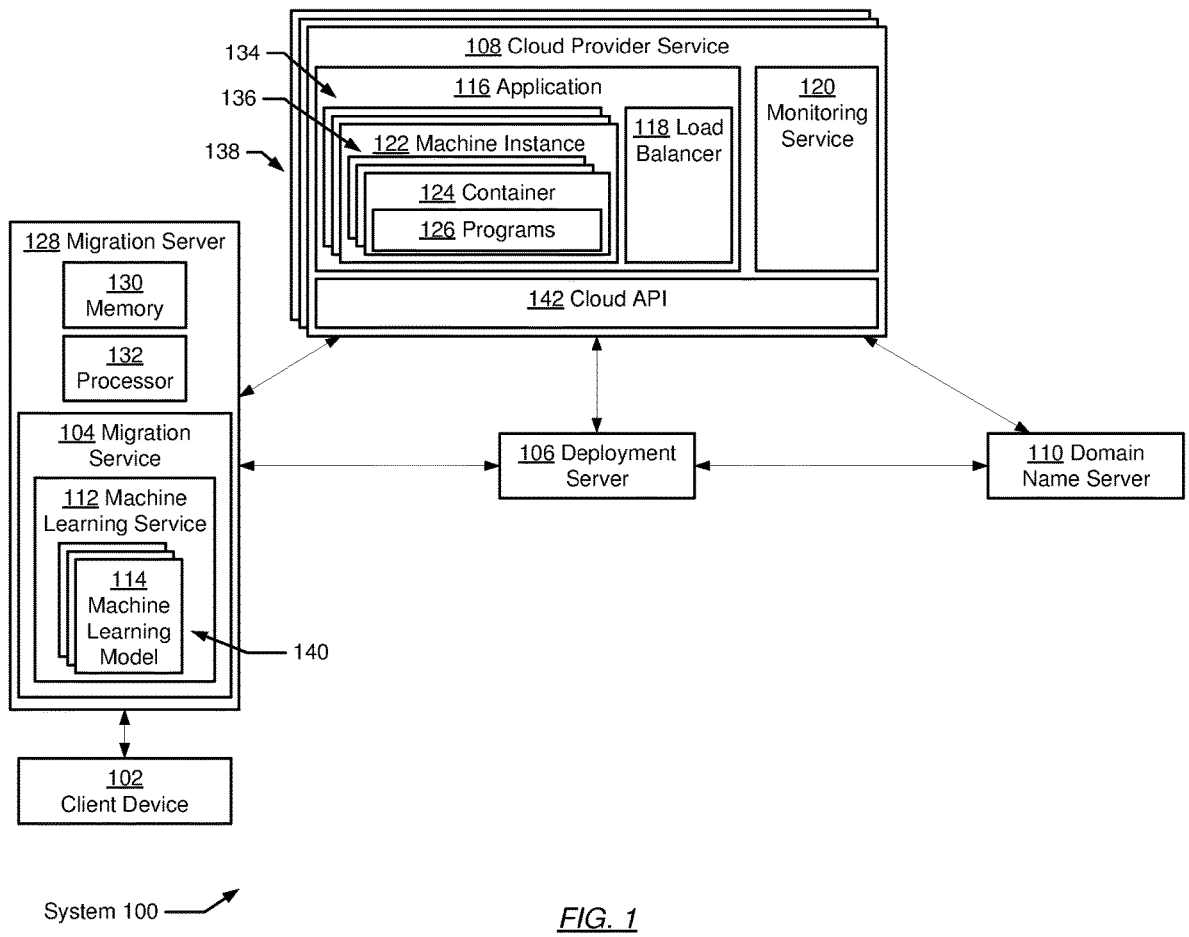
FIG. 1 shows a system in accordance with one or more embodiments of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure gather pricing data, performance data, and budget data. The pricing data is from various cloud providers on different pricing options. The performance data includes data on the application environment, resource utilization metrics, and traffic patterns for the application at regular intervals of time. The budget data includes data gathered from a user on budget goals, a service level agreement (SLA), etc. The SLA is a commitment (or contract) between a service provider (either internal or external) and the end user (e.g. consumer, client, etc.) that defines the level of service expected from the service provider. SLAs are typically output-based in that their purpose is specifically to define what the customer will receive. The cost of running the application in different cloud providers is determined and a recommendation to migrate the application to an alternate cloud provider (or continue with the current cloud provider) is formed to utilize a cost optimized pricing model for the next set interval of time (e.g., next peak or non-peak time of traffic or days etc.) so that running the application meets the budget goals and the SLA.

FIG. 1 shows a diagram of a system (100) in accordance with one or more embodiments of the invention. The various components of the system (100) may correspond to the computing system shown in FIG. 7A and FIG. 7B. In particular, the type, hardware, and computer readable medium for the various components of the system (100) is presented in reference to FIG. 7A and FIG. 7B. FIG. 1 shows a component diagram of the system (100). The system (100) includes the client device (102), the migration server (128), the deployment server (106), the cloud provider services (138) and the domain name server (DNS) (110). In one or more embodiments, one or more of the components shown in FIG. 1 may be omitted, repeated, combined, and/or altered as shown from FIG. 1. Accordingly, the scope of the present disclosure should not be considered limited to the specific arrangement of components shown in FIG. 1.

The client device (102) includes a collection of programs operating on at least one client machine. In one or more embodiments, the client device (102) is a computer (e.g., smartphone, tablet computer, desktop computer, etc.) executing a client application, such as a web browser. In one or more embodiments, the client device (102) is a server computer executing a stack of programs and components that provide, for example, a web service. In one or more embodiments, the client device (102) is used by a developer to operate, maintain, and interact with the application (116) and the migration service (104).

In one or more embodiments, the client device (102) provides budget information to the migration service (104). In one or more embodiments, the client device (102) presents notifications from the cloud provider service regarding the performance of the application (116) and presents notifications from the migration service (104) about the migration of the application (116) between different cloud provider services (138).

The migration server (128) is a collection of physical and virtual machines that run the migration service (104). The migration server (128) includes the memory (130), the processor (132), and the migration service (104). The memory (130) is coupled to the processor (132). In one or more embodiments, the migration service (104), the machine learning service (112), and the machine learning model (114) each execute on the processor (132) and use the memory (130).

The migration service (104) is a collection of programs operating on the migration server (128). In one or more embodiments, the migration service (104) receives budget information from the client device (102), pricing information from the cloud provider services (138), and performance information about the application (116) from the monitoring service (120) running on the cloud provider service (108) hosting the application (116). In response to the received information, the migration service (104) migrates the application (116) from a first cloud provider service (108) to a second cloud provider service in the set of cloud provider services (138). The migration service (104) includes the machine learning service (112).

The machine learning service (112) is a collection of programs operating on the migration server (128). In one or more embodiments, the machine learning service (112) stores the budget, pricing, and performance information received by the migration server (128) as historical information. The machine learning service (112) includes a set of machine learning models (140). The machine learning service (112) operates the machine learning models (140) to generate predictions that are used to generate migration instructions for migrating the application (116) between cloud provider services (138).

Each of the machine learning models (140) is a collection of programs operating on the migration server (128). In one or more embodiments, there is a one to one mapping of machine learning models (140) to cloud provider services (138) and, as an example, the machine learning model (114) generates predictions for the cloud provider service (108). Each of the machine learning models (140) are trained with the historical information and generate predictions based on that training. In one or more embodiments, the machine learning models (140) are each a neural network model, as described in FIG. 2. Additional and alternative embodiments can have a single machine learning model that generates the outputs for the entire set of cloud provider services (138).

The deployment server (106) is a collection of physical and virtual machines that deploy an application (116) to a cloud provider service (108). The deployment server (106) can update the location of an application (116) in the domain name server (110) and can deploy and remove the application (116) to and from the cloud provider services (138).

The domain name server (110) is a name server of a domain name system (DNS). The domain name server (110) translates domain names to the numerical internet protocol (IP) addresses for locating and identifying the application (116) within a network such as the internet.

Each of the cloud provider services (138) is a collection of programs operating on a collection of server machines. In one or more embodiments, each of the cloud provider services (138) can be configured to host the application (116), host the monitoring service (120), and expose a respective cloud application programming interface (API) (116). As an example, the cloud provider service (108) is currently hosting the application (116), hosting the monitoring service (120), and exposing the cloud API (142).

The application (116) is a containerized application that includes a collection of programs operating on a collection of machine instances (134) hosted within the cloud provider service (108). In one or more embodiments, the application (116) is deployed with a set of containers (136) to a set of machine instances (134) and the application is balanced with the load balancer (118). In one or more embodiments, the application (116) is a client-server computer program in which the client, e.g., the client device (102), runs a web browser and provides functions for webmail, online retail sales, online auctions, wikis, instant messaging services, etc.

The machine instances (134) are virtual machine instances provided by the cloud provider service (108) that hosts the containers (136) of the application (116). In one or more embodiments, each of the machine instances (134) includes a fixed amount of processing, memory, and storage from a physical machine that hosts a respective one of the machine instances (134). Each of the machine instances (134) hosts a set of containers (136) that execute the functions of the application (116). In one or more embodiments, each of the machine instances (122) corresponds to one type of machine instance provided by the cloud provider service (108) and enumerated in a list of machine instance types. Each machine instance type in the list of machine instance types identifies a type of virtual machine instance.

The processing of a machine instance (122) is the processing power of the machine instance (122), which can be measured and limited by one or more of the number of cores, the number of virtual cores, the number of threads, the number of processing cycles, etc., that are available to the physical machine hosting the machine instance (122) on a real or percentage basis.

The memory of a machine instance (122) is the amount of memory available to the machine instance (122). In one or more embodiments, the memory is a dynamic random access memory (DRAM) to which access by the machine instance (122) is limited on a real or percentage basis.

The storage of a machine instance (122) is the amount of storage available to the machine instance (122). In one or more embodiments, the storage is a solid state storage device (SSD) to which access by the machine instance is limited on a real or percentage basis.

Each of the containers (136) on the machine instance (122) includes a set of programs (126) and the configuration of each of the containers (136) is controlled by a set of parameters. The parameters include several types of parameters and are used to control and limit the resources used by the container. Parameters of a first type control access to hardware resources and limit, for example, how much of the processing, the memory, and the storage of the machine instance (122) can be consumed by a container (124). Parameters of a second type can include, for example, limits to resources provided by the operating system, the number of sockets used by programs (126), the heap size, etc. In one or more embodiments, the container (124) is a Docker container managed by Kubernetes operating in a Linux environment.

The programs (126) are a set of programs within the container (124) executing on the machine instance (122) as a part of the application (116). The programs (126) can include a web server, a database server, an application server, an application, an application that performs the logic utilized by other applications, a monitoring agent, etc. In one or more embodiments, the monitoring agent monitors the performance of the container (124) by reporting the resources that are both available to and consumed by the container (124) to the monitoring service (120).

The load balancer (118) improves the distribution of workloads across the machine instances (134) and the containers (136). In one or more embodiments, the load balancer (118) optimizes resource use, maximizes throughput, minimizes response time, and avoids overload of any single resource used by the application (116). The load balancer (118) provides performance information to the monitoring service (120) that includes latency measurements, throughput measurements, and traffic measurements for each of the machine instances (134) and for each of the containers (136).

The monitoring service (120) is a collection of programs operating on a collection of server machines in the cloud provider service (108). In one or more embodiments, the monitoring service (120) records and analyzes the performance information provided by the application (116), e.g., from the load balancer (118) and from performance measurement agents within the containers (136). The performance information is recorded into a database and can be reported and forwarded to the resource allocation service. In one or more embodiments, the monitoring service (120) generates alerts based on an analysis of the performance information.

The cloud API (142) is exposed by the cloud provider service (108) to provide access to the components and services hosted within the cloud provider service (108). In one or more embodiments, the cloud API (142) is a set of subroutine definitions, communication protocols, and tools that are used to access and control the services, applications, and machine instances hosted within the cloud provider service (108). Each of the cloud provider services (138) can include a customized cloud API.

Figure 2:
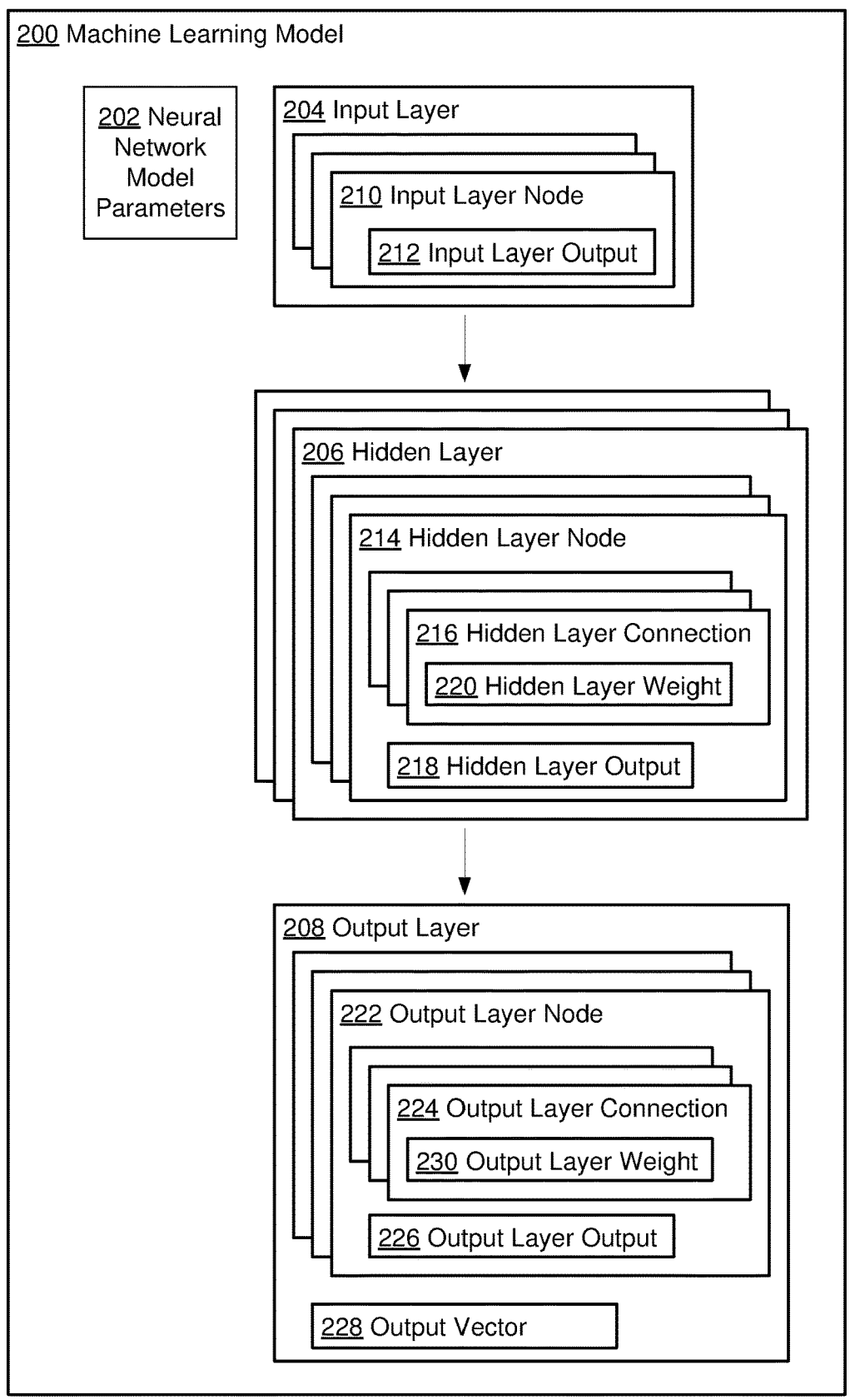
FIG. 2 shows a diagram of a machine learning model in accordance with one or more embodiments of the present disclosure.

FIG. 2 shows the machine learning model (200) in accordance with one or more embodiments. In one or more embodiments, one or more of the components shown in FIG. 2 may be omitted, repeated, combined, and/or placed in a different arrangement than the arrangement shown in FIG. 2. Accordingly, the scope of the present disclosure should not be considered limited to the specific arrangement shown in FIG. 2.

The machine learning model (200) is formed as a neural network that includes the neural network model parameters (202), the input layer (204), the one or more hidden layers (206), and the output layer (208). A machine learning service generates the neural network model input features that are input to the input layer (204), processed by the hidden layers (206), and then processed by the output layer (208) to generate the output vector (228).

The neural network parameters (202) specify and define the machine learning model (200) and its behavior. In one or more embodiments, the parameters (202) include a definition of the machine learning model (200) that identifies the number of nodes, layers, and connections in the neural network formed by the machine learning model (200) as well as the activation functions, hyperparameters, batch size, bias, etc. In one or more embodiments, the activation function used by the nodes of the neural network is a rectified linear unit (ReLU) activation function.

The input layer (204) includes one or more nodes (210). In one or more embodiments, each input layer node (210) includes an output (212). In one or more embodiments, the input layer (204) includes six nodes (210), one for each of the six neural network model features identified in Table 1 below.

TABLE 1

| | |
|---|---|
| pricing % | 1 - available pricing divided by setup pricing |
| processing % | current processor usage divided by available processing power |
| memory % | current memory usage divided by available memory |
| storage % | current storage usage divided by available storage |
| latency % | current latency divided by predefined latency |
| traffic % | current traffic load divided by baseline traffic load |

In one or more embodiments, the available pricing is the pricing that is currently offered by a cloud provider service, which can be a different cloud provider service from the cloud provider service that is currently hosting the application. The set up pricing is the pricing that is currently used by the cloud provider service that is currently hosting the application for billing the costs incurred by the execution of the application. Dividing the available pricing by the setup pricing generates a rational number that is subtracted from 1 to generate the pricing percentage. The pricing percentage indicates how much costs would increase (positive values) or decrease (negative values) by changing to the cloud service provider associated with the available pricing. In one or more embodiments, the pricing percentage can be scaled to a number between zero and one, such as by using a sigmoid function.

In one or more embodiments, the processor usage is based on one or more of the number of cores, the number of virtual cores, the number of threads, the number of processing cycles, a sum (adding one or more of the previous values), a weighted sum, etc. In one or more embodiments, the memory usage and storage usage can be measured in a denomination of bytes, including megabytes and gigabytes. In one or more embodiments, the latency is the amount of time taken for a response to be sent in response to a request received by the application and is denominated in units of time, such as seconds, milliseconds, or microseconds, etc., and the predefined latency is a targeted latency time for how long responses should take. In one or more embodiments, the traffic load is the number of requests handled by a particular container and the baseline traffic load is one of an average traffic load for all containers or a targeted number of handled requests for a container.

Each of the one or more hidden layers (206) includes one or more nodes (214). In one or more embodiments, each hidden layer node (214) includes one or more connections (216) and an output (218). Each hidden layer connection (216) of a hidden layer node (214) identifies another node within the neural network model that is used as an input to the node comprising the connection (216). Each hidden layer connection (216) includes a weight (220). The output (218) is calculated by performing a multiply accumulate operation. In the multiply accumulate operation, for each node connected to a given node, the outputs of the connected nodes are multiplied by a respective weight and each of these multiplicative results is summed to form a summed value. The summed value is activated by applying the activation function to the summed value to form the output (218). In one or more embodiments, the neural network model (116) includes two hidden layers (206). The first hidden layer includes at least six nodes (214) that are fully connected to the six input layer nodes. In being fully connected, each of the nodes in the first hidden layer has a connection to each of the five nodes in the input layer. The second hidden layer (206) includes at least six nodes (214) that are fully connected to the nodes of the first hidden layer (206).

The output layer (208) includes one or more nodes (222) and an output vector (228). Each output layer node (222) includes one or more connections (224) and an output (226). The output layer connections each include a weight (230). The nodes (222), connections (224), weights (230), and output (226) operate in a similar fashion to those described in the hidden layers (206). The output vector (228) includes an element for the output (226) of each output layer node (222) and can be extended with additional elements. In one or more embodiments, the output layer (208) includes three nodes (222), one for each of the neural network model features identified in Table 2 below. In one or more embodiments, each output (226) is one of a real number, a binary value, and a Boolean value.

TABLE 2

| | |
|---|---|
| first output | update machine instance types |
| second output | update container configurations |
| third output | update autoscaling configuration |
| fourth output | migrate application |

In one or more embodiments, the first output indicates whether the machine instance types should be updated. The machine instance types can be updated by swapping the machine instance types with less expensive versions.

In one or more embodiments, the second output indicates whether the container configurations should be updated. Each container includes a configuration that identifies the amount of processing, amount of memory, amount of storage, etc. that can be utilized by the container on a machine instance. The second output indicates whether the configurations of the containers should be updated by changing the parameters that control the processing, memory, storage, etc.

In one or more embodiments, the third output indicates whether the autoscaling configuration should be updated. The autoscaling configuration controls the number of containers that are being used to implement the application. The third output indicates whether the autoscaling configuration, i.e., the number of the containers and machine instances, should be updated by adding or removing containers.

In one or more embodiments, the fourth output indicates whether an application should be migrated to another cloud provider. Additional outputs can also be provided.

As an example, with the first three outputs from Table 2, the outputs are combined to form an output vector. Table 3 below lists different output vectors that can be generated by the system using the first three outputs from Table 2.

TABLE 3

| Output vector | Description |
|---|---|
| [0, 0, 0] | no change recommended |
| [0, 0, 1] | recommend to update autoscale configuration |
| [0, 1, 0] | recommend to update container configurations |
| [0, 1, 1] | recommend to update container configurations and autoscale |
| [1, 0, 0] | better pricing available, swap machine instances with the cheaper machine instances |
| [1, 0, 1] | Recommend to swap machine instances and update autoscale configuration |
| [1, 1, 0] | Recommend to swap machine instances and update container configuration |
| [1, 1, 1] | Recommend to swap machine instances, update container configuration, and update autoscale configuration, and/or consider migrating to alternate cloud provider service |

In one or more embodiments, instead of or in addition to the activation function being used, a softmax function is applied to identify the output with the highest value. The output with the highest value is then assigned one and the remaining outputs are assigned zero to form the output vector (228) as a one-hot vector.

Figure 3:
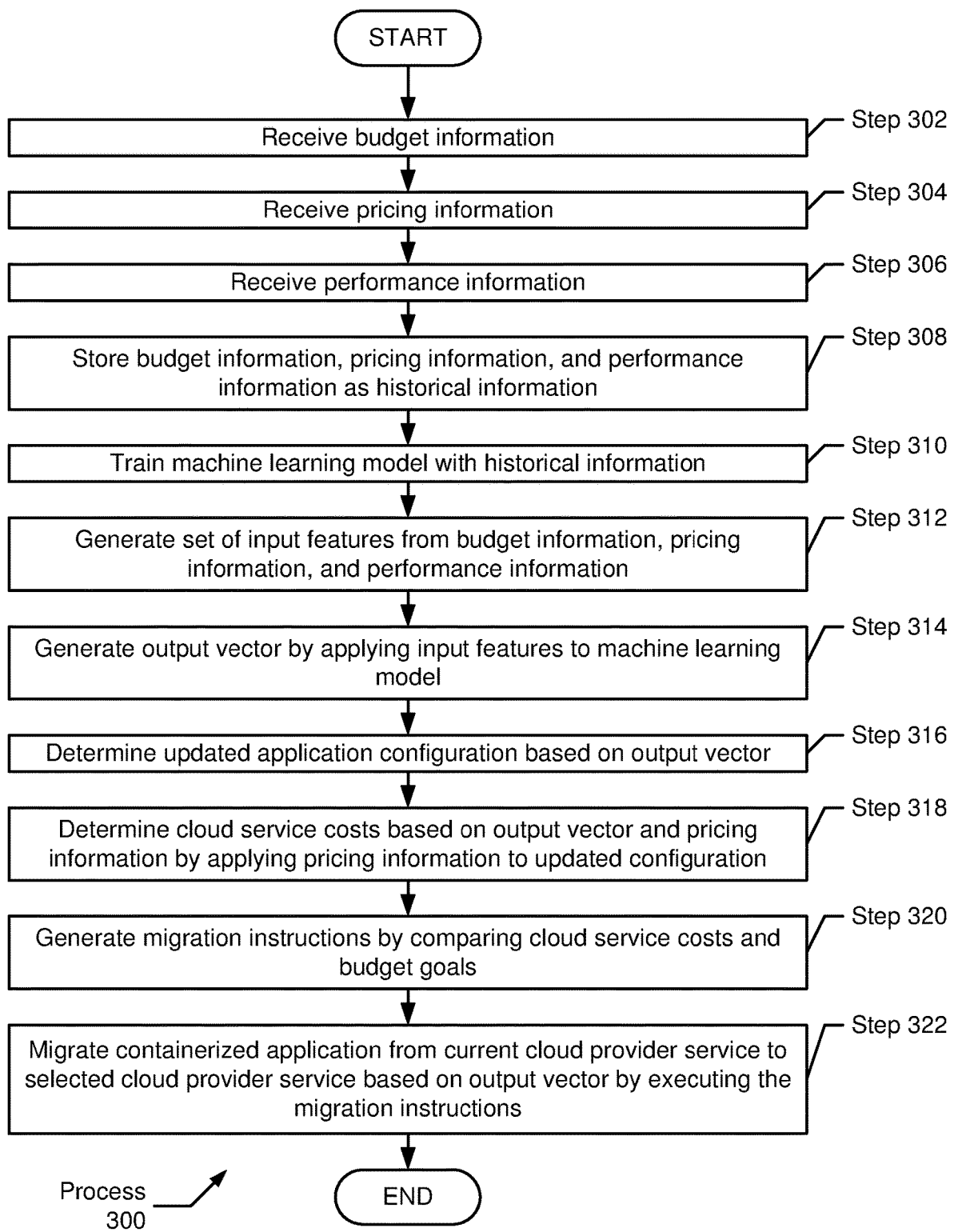
FIG. 3 shows a method for application migration between cloud providers in accordance with one or more embodiments of the present disclosure.

FIG. 3 shows a flowchart in accordance with one or more embodiments of the present disclosure. The flowchart of FIG. 3 depicts a process (300) for cost optimized migration between cloud providers. The process (300) can be implemented on one or more components of the system (100) of FIG. 1. In one or more embodiments, one or more of the steps shown in FIG. 3 may be omitted, repeated, combined, and/or performed in a different order than the order shown in FIG. 3. Accordingly, the scope of the present disclosure should not be considered limited to the specific arrangement of steps shown in FIG. 3.

In Step 302, budget information is received. In one or more embodiments, the budget information is transmitted from a client device using a client application, such as a web browser, and is received by a migration service. The budget information identifies budget goals for the application and can include a service level agreement (SLA). In one or more embodiments, the budget goals identify cost limits for running the application and can define a total cost, total cost per unit of time (per year, per hour, etc.), total cost per machine instance, and total cost per machine instance per unit of time. In one or more embodiments, the budget goals include a cost reduction threshold and a wait time threshold. The cost reduction threshold identifies the minimum percentage amount of cost reduction that is required in order for a migration to be performed. The wait time threshold identifies the minimum amount of time that must pass before a subsequent migration can be performed.

In Step 304, pricing information is received. In one or more embodiments, the pricing information is transmitted from each cloud provider service and is received by the migration service in response to a request from the migration service for the pricing information. The pricing information identifies the costs for running the machine instances on which the containers of the application are deployed and can include licensing costs for the programs and frameworks used by the application and its containers. In one or more embodiments, the costs are quantified as the cost per machine instance per unit of time in a list of machine instance types. Each type of machine instance can have its own cost associated with it. The machine instances that have more available resources (processing power, memory, storage) generally have a higher cost than the machine instances with fewer available resources. In one or more embodiments, the pricing information includes a price for each machine instance type of the list of machine instance types as well as license costs for the agents and frameworks used by the application.

In one or more embodiments, the pricing information includes a price for each machine instance type from a list of machine instance types from each cloud provider service of the set of cloud provider services. In one or more embodiments, each machine instance of the machine instances running the application corresponds with a same machine instance type of a first list of machine instance types from the first cloud provider service. In one or more embodiments, each machine instance of the machine instances running the application hosts a container of the set of containers. In one or more embodiments, each machine instance type of the list of machine instance types identifies a type of virtual machine.

In Step 306, performance information is received. In one or more embodiments, the performance information is received by the migration service from the monitoring service, which received the performance information from the load balancer of the application and from the monitoring agents within the containers of the application. In one or more embodiments, the monitoring service stores the performance information in a database accessible to the monitoring service and then transmits the performance information to the migration service. Transmission of the performance information from the monitoring service can be pushed to the migration service as soon as updates are made or pushed periodically. Transmission of the performance information can also be pulled from the monitoring service in response to requests from the migration service. In one or more embodiments, the performance information includes a processor value, a memory value, a storage value, a latency value, and a traffic value for each container of the set of containers that execute the application. In one or more embodiments, the performance information per container is aggregated to average values.

In Step 308, the budget information, pricing information, and performance information is stored as historical information. In one or more embodiments, the migration service stores the budget information, pricing information, and performance information to a database that is accessible by the machine learning service.

In Step 310, the machine learning model is trained with the historical information. In one or more embodiments, the machine learning service trains the machine learning model using the historical information that was received and stored by the machine learning service. Training the machine learning model is further described below with reference to FIG. 4.

In Step 312, input features are generated from the budget information, pricing information, and performance formation. In one or more embodiments, the machine learning service generates the input features from the most current values for the budget information, pricing information, and performance information received from the client device, the cloud provider services, and the monitoring service. As an example, the machine learning service generates values for the features listed in Table 1 above from the performance information received from the monitoring service and the monitoring agents of the containers of the application.

In Step 314, an output vector is generated by applying the input features to the machine learning model. In one or more embodiments, the machine learning service provides the input features to the machine learning model, which generates the output vector from the input features.

In Step 316, an updated application configuration is determined. In one or more embodiments, the updated application configuration is determined based on the output vector. The output vector identifies whether the machine instance types, the container configurations, and the autoscaling configuration (which together form the application configuration) should be updated. When the output vector indicates that one of the elements of the application configuration should be updated, the migration service identifies the appropriate resources to in order to update the application configuration.

For example, when the machine instance type needs to be updated, the migration service identifies a machine instance type. The migration service identifies a machine instance type by selecting the machine instance type that meets the minimum hardware specifications for the application with the lowest cost.

When the container configurations need to be updated, the migration service identifies the parameters of the container configuration that need to be updated. In one or more embodiments, the identification is performed by comparing the performance information from the monitoring service to a set of thresholds and adjusting the container configuration parameters based on the comparison of the performance information to the threshold value. As an example, the performance information for the processor usage is compared to maximum and minimum thresholds, and if either of the thresholds is reached, then the migration service changes the processor percentage available to the container buy a predetermined amount assigned to the threshold that is reached.

When the autoscaling configuration needs to be updated, the migration service identifies the updates to autoscaling configuration based on the performance information received from the monitoring service. As an example, the migration service compares the traffic handled by the application to a threshold amount and if the average traffic per container exceeds the threshold amount, then the migration service will add additional containers in the updated application configuration.

In Step 318, cloud service costs based on the output vector and pricing information is determined. In one or more embodiments, the cloud service costs are determined by the migration service by applying the pricing information to the updated application configuration. The updated application configuration can change the configuration of the resources by adjusting the number and type of machine instances and by adjusting the number and configuration of containers used to execute the application. The migration service generates a configuration model that takes into account the updated application configuration and is enumerated in units used by the pricing information. The pricing information is then applied to the configuration model to determine the updated configuration cost for running the application using the updated application configuration. A configuration model is generated for each cloud provider service of a plurality of cloud provider services based on the pricing information and updated application configuration for each cloud provider service. For example, the pricing information can be denominated in dollars per machine instance per hour and the updated application configuration can change the hardware resources and update the machine instance type to have the application run on a different number of machine instances of a different type. The new number of machine instances is multiplied by the cost per machine instance per hour to determine the cost per hour for running the application for each cloud provider service.

In step 320, migration instructions are generated. In one or more embodiments, the migration service generates the migration instructions by comparing the costs for each of the cloud provider services and the budget goals. The cloud provider services that are unable to run the application within the budget goals are removed from the comparison. The remaining cloud provider services are compared based on cost and the cloud provider service with the least cost is identified as the selected cloud provider service.

If the selected cloud provider service is the same as the current cloud provider service that is hosting the application, then there is no migration between cloud provider services. The migration instructions in this case can include updating the machine instance types, the container configurations, and the autoscaling configuration without instructions for deploying the application to a different cloud provider service.

If the selected cloud provider service is different from the current cloud provider service, then the application will be migrated to the selected cloud provider service. The migration instructions in this case include instructions for deploying the application to the selected cloud provider service and removing some or all of the application from the current cloud provider service. In one or more embodiments, the migration instructions include instructions for replicating a database from the current cloud provider service to the selected cloud provider service. Additional and alternative embodiments can have some or all of the database for the application remain on the current cloud provider service while moving the rest of the application to the selected cloud provider service.

In step 322, the containerized application is migrated. In one or more embodiments, the application is migrated from the current cloud provider service to the selected cloud provider service based on the output vector by executing the migration instructions. The migration server executes the migration instructions and controls the deployment server to cause the deployment server to deploy the application to the selected cloud provider service. After deploying the application, the domain name system entry for the application is updated to direct the traffic of the application to the version of the application executing on the selected cloud provider service. After running the application on the selected cloud provider service for a minimum length of time or a minimum number of transactions, the deployment server then removes the application from the old cloud provider service.

Figure 4:
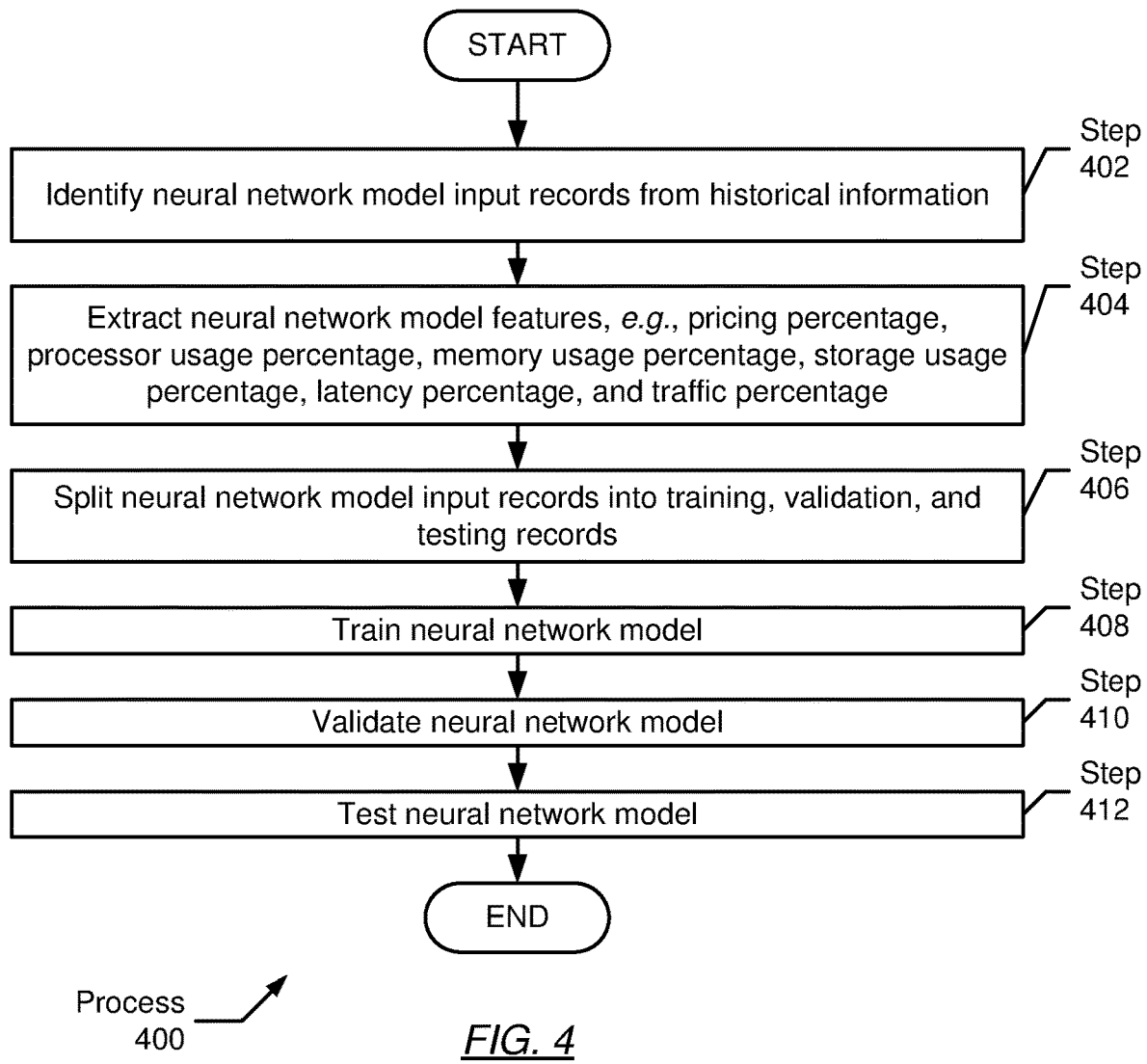
FIG. 4 shows a method for initializing a neural network model in accordance with one or more embodiments of the present disclosure.

FIG. 4 shows a flowchart in accordance with one or more embodiments of the present disclosure. The flowchart of FIG. 4 depicts a process (400) for initializing a neural network model, such as the model (200) described in FIG. 2. The process (400) can be implemented on one or more components of the system (100) of FIG. 1. In one or more embodiments, one or more of the steps shown in FIG. 4 may be omitted, repeated, combined, and/or performed in a different order than the order shown in FIG. 4. Accordingly, the scope of the present disclosure should not be considered limited to the specific arrangement of steps shown in FIG. 4.

In Step 402, neural network model input records are identified from historical information. In one or more embodiments, all of the records from the historical information are identified except for records that are dated less than 30 days old.

In Step 404, neural network model features are extracted from the input records. In one or more embodiments, the extracted features include values for pricing percentage, processing percentage, memory percentage, storage percentage, latency percentage, and traffic percentage, which are described above in relation to Table 1.

In Step 406, the input records are split into training records, validation records, and testing records. In one or more embodiments, the training records include 70% of the input records selected at random, the validation records include 20% of the input records selected at random, and the testing records include 10% of the input records selected at random.

In Step 408, the neural network model is trained with the training records by: generating training predictions with the training records, calculating training prediction errors from the training predictions, updating the neural network model by backpropagating the training prediction errors and updating the weights of the neural network model based on backpropagated training prediction errors, and generating a training accuracy from the training record predictions and the training records.

In one or more embodiments, a training prediction is generated by feeding the neural network features extracted from an input record into the input layer of the neural network. The output from the input layer is propagated forward through the hidden layers to the output layer to form the output vector as the training prediction.

In one or more embodiments, a training prediction error is calculated as the difference between the training prediction and a known correct value from the input record. For example, when the input record indicates that the pricing percentage, the processor percentage, the memory percentage, the storage percentage, the traffic percentage, and the latency percentage are each 100%, then the output vector should be [1,1,1] to indicate that the machine types, the container configurations, and the autoscaling configuration should each be adjusted and the application migrated.

In one or more embodiments, backpropagating the training prediction error is performed by splitting the training prediction error for a given node among the set of connected nodes that are connected to the given node. In one or more embodiments, the training prediction error is split proportionally based on the weight of a connection. In one or more embodiments the weights are updated to reduce the amount of error between the training prediction and the known correct value.

The training accuracy is a ratio of correct predictions divided by the total number of predictions. In one or more embodiments, the training accuracy for the neural network model is determined by generating a prediction for each input record. In one or more embodiments, the training prediction used for the training accuracy is generated without adjusting the weights of the neural network.

In Step 410, the neural network model is validated with the validation records by: generating validation predictions with the validation records, generating a validation accuracy from validation predictions and validation records, comparing the validation accuracy to the training accuracy, and repeating the training step based on the comparison of the validation accuracy to the training accuracy. The validation predictions and the validation accuracy are generated and calculated similar to how the training predictions and training accuracy are calculated with the exception that the validation records are used instead of the training records.

In one or more embodiments, comparison of the validation accuracy to the training accuracy occurs after a number of training steps have been performed and identifies whether the validation accuracy is improving by an amount that is similar to improvement of the training accuracy. If the validation accuracy stops improving while the training accuracy continues to improve, then the neural network model may have been overfitted to the input records. In one or more embodiments, if the training accuracy improves and the validation accuracy improves by at least a threshold percentage, e.g., (validation accuracy/training accuracy)≥90%, then the training step will be repeated.

In Step 412, the neural network model is tested with the testing records by generating testing record predictions with the testing records and generating a testing accuracy from the testing record predictions and testing records. The testing predictions and the testing accuracy are generated and calculated similar to how the training predictions and training accuracy are calculated with the exception that the testing records are used instead of the training records. The testing accuracy is generated to provide an unbiased measure of the accuracy of the neural network model.

FIG. 5 shows an output in accordance with one or more embodiments of the present disclosure. The output is in a tabular form with rows and columns and can be presented using one or more components of the system (100) of FIG. 1. For example, the client device (102) of FIG. 1 can show one or more of the depicted rows and columns to a user. In one or more embodiments, one or more of the rows and columns shown in FIG. 5 may be omitted, repeated, combined, and/or presented in a different order than the order shown in FIG. 5. Accordingly, the scope of the present disclosure should not be considered limited to the specific arrangement of rows and columns shown in FIG. 5.

The table (500) includes a set of rows (502)-(520) and a set of columns (522)-(542). The rows (502) and (504) are header rows. Each of the rows (506)-(520) forms a record that includes a set of input features (columns (524)-(534)) and an output vector (columns (536)-(540)). The rows (506)-(512) are associated with a first point in time and the rows (514)-(520) are associated with a subsequent point in time. The column (522) includes a field that identifies the cloud provider service of a row. The columns (524)-(534) include fields for pricing percentage, processor percentage, memory percentage, storage percentage, latency percentage, and traffic percentage, which are similar to the features described above in Table 1. The columns (536)-(540) include fields for the outputs of a machine learning model (such as a neural network) that form the output vector, which are similar to the features described above in Table 2.

In one or more embodiments, the input feature values in the columns (524)-(534) are real numbers in the range of 0 to 1. In one or more embodiments, each element in the output vector in the columns (536)-(540) is either a zero or a one.

In one or more embodiments, the table (500) is generated dynamically as the migration service receives the performance information from the monitoring service. The pricing information is periodically pulled from each of the cloud provider services. In one or more embodiments, the values in the columns (524)-(534) are generated by the machine learning service in response to detecting a change in the pricing information of at least one cloud provider service. After generating the values in the columns (524)-(534) for a record, the values in the columns (524)-(534) are passed into the machine learning model to generate the output vector in the columns (536)-(540). The output vector in the columns (536)-(540) is used to generate the values in the column (542), which identifies the cost percentage difference that is predicted to occur when migrating based on the output vector. The output vector in the columns (536)-(540) is used by the machine learning service and the migration service to generate migration instructions to migrate the application between the cloud provider services, as described in Steps 318-322 of FIG. 3. In one or more embodiments, the migration instructions modify the deployment of the application on the same cloud provider service.

In this example, the application is running on the first cloud provider service (cps1) that is associated with the rows (506) and (514). The table (500) indicates that at the first point in time (the rows (506)-(512)), changing the current configuration on the first cloud provider service (cps1) would entail an 8% cost increase and that migrating to the fourth cloud provider service (cps4) would entail a 3.6% cost decrease. A budget goal for this system is that a migration would have to reduce cost by at least 5%, which is not available at the first point in time (the rows (506)-(512)). At the second point in time (the rows (514)-(520)), the fourth cloud provider service (cps4) provides a savings of 7.5%, which meets the budget goal, and the migration service migrates the application from the first cloud provider service to the fourth cloud provider service.

Figure 6A:
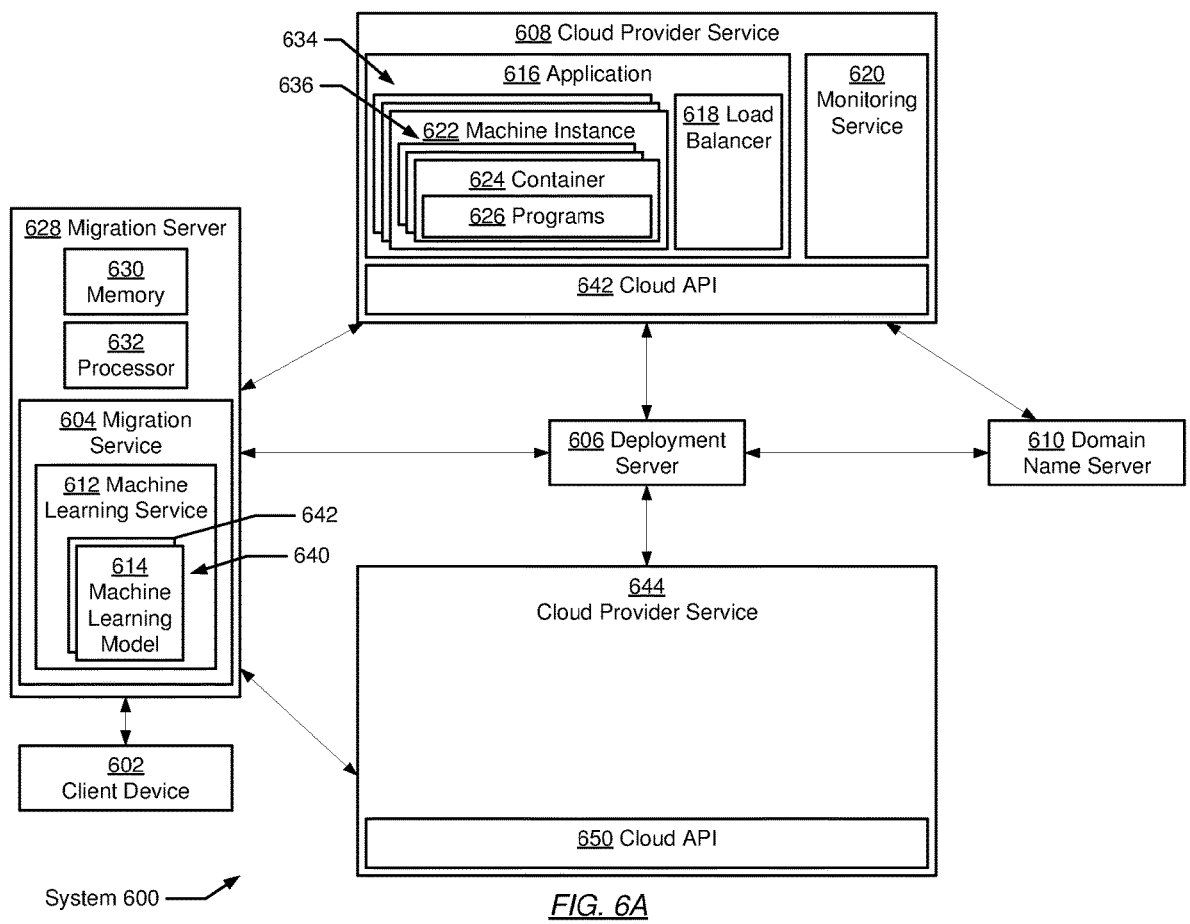
FIG. 6A, FIG. 6B, and FIG. 6C show an example of application migration between cloud providers in accordance with one or more embodiments of the invention.
Figure 6B:
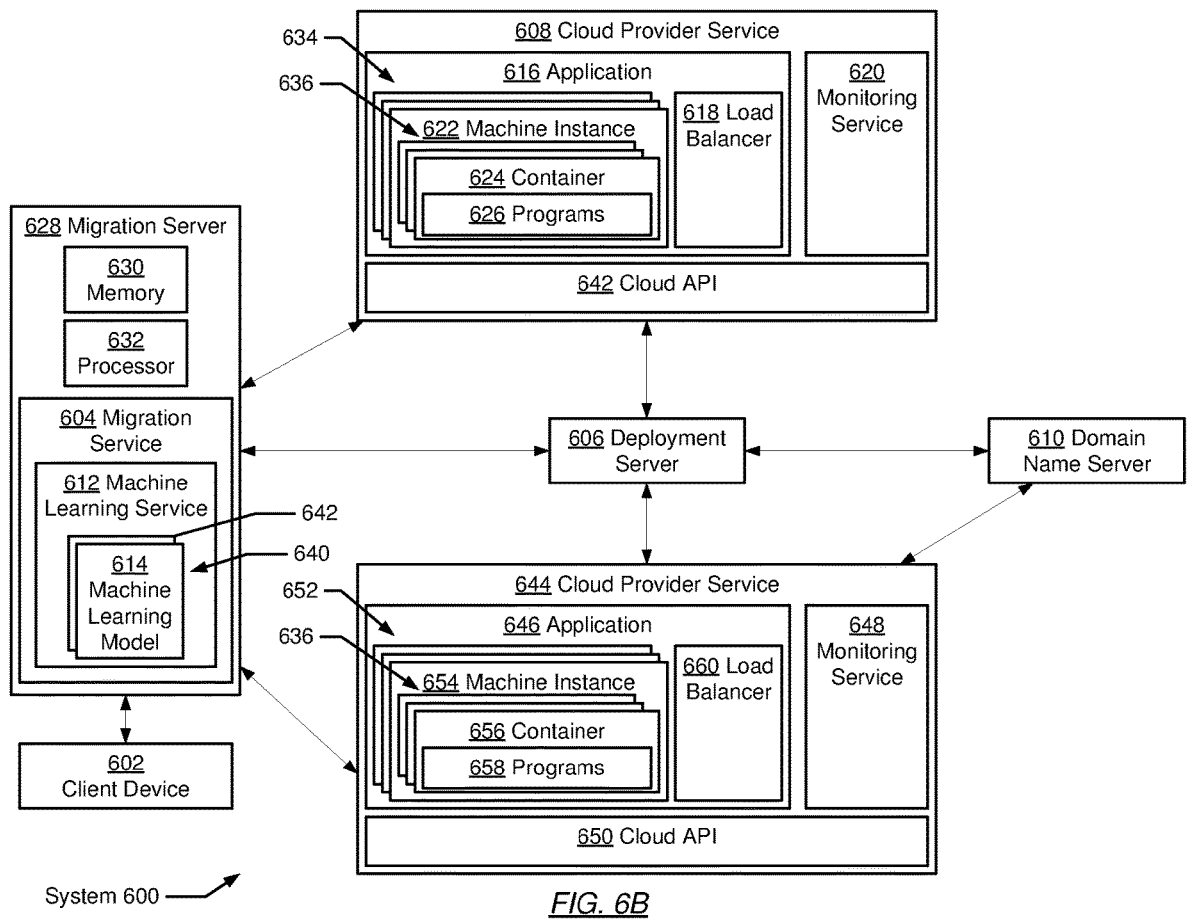
Figure 6C:
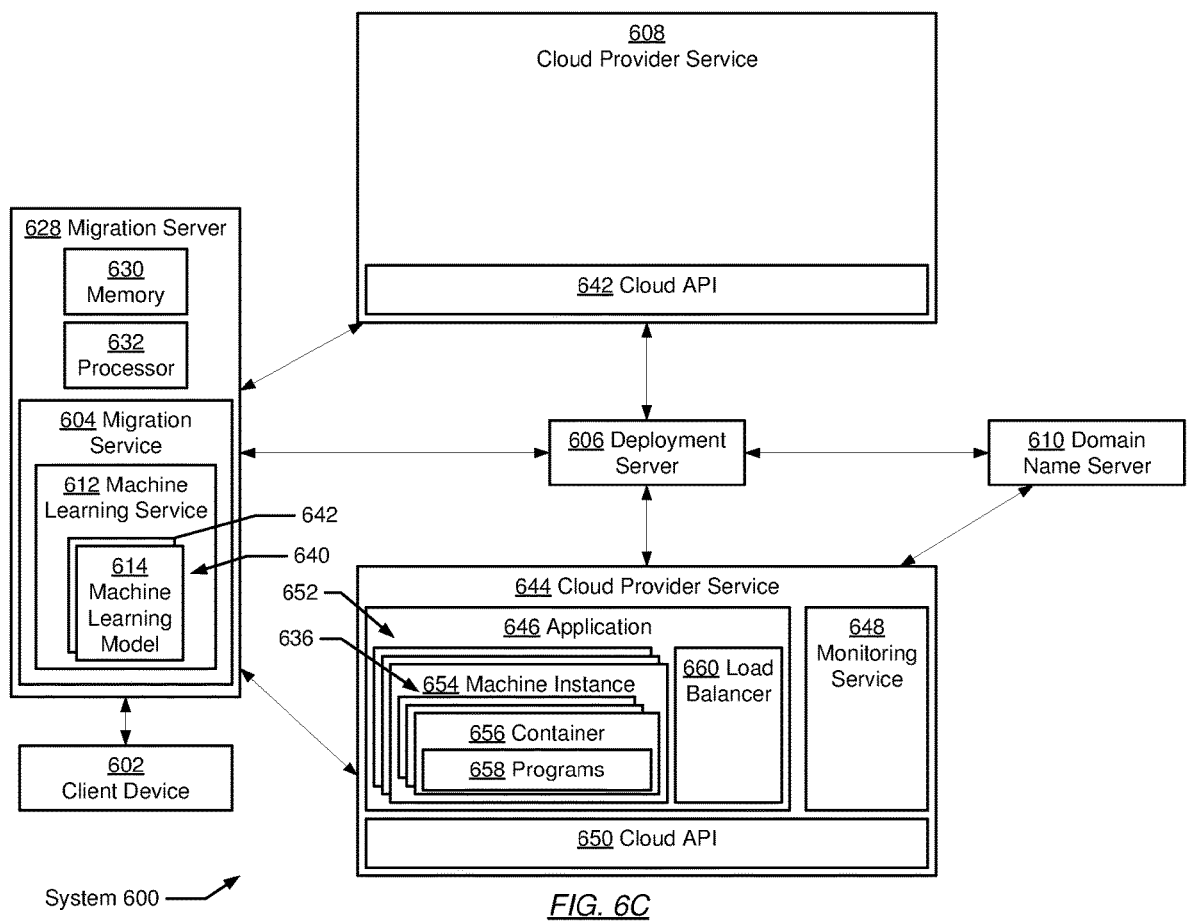

FIGS. 6A, 6B, and 6C show the migration of an application (616, 646) from a first cloud provider service (608) to a second cloud provider service (644) in the system (600). The components and modules of the system (600) are similar to those of the system (100) described in FIG. 1. One or more of the components shown in FIGS. 6A, 6B, and 6C may be omitted, repeated, combined, and/or placed in a different arrangement than the arrangement shown. Accordingly, the scope of the present disclosure should not be considered limited to the specific arrangement shown in FIGS. 6A, 6B, and 6C.

Referring to FIG. 6A, the cloud provider service (608) hosts the application (616), hosts the monitoring service (620), and exposes the cloud API (642). The application (616) includes the machine instances (634) and the load balancer (618). The set of machine instances (634) includes the machine instance (622), which includes the containers (636). The set of containers (636) includes the container (624), which includes the programs (626).

The migration servers (628) includes the memory (630), the processor (632), and the migration service (604). The migration service includes the machine learning service (612), which includes the set of machine learning models (640). The set of machine learning models (640) includes the first machine learning model (614) that is associated with the first cloud provider service (608) and includes the second machine learning model (642), which is associated with the second cloud provider service (644).

The deployment server (606) is connected to the migration server (628), the first cloud provider service (608), the second cloud provider service (644), and the domain name server (610). The deployment server (606) is controlled by the machine learning service (612).

The domain name server (610) is connected to the deployment server (606) and the cloud provider service (608). The domain name server (610) in FIG. 6A routes traffic to the instance of the application (616) running on the cloud provider service (608).

The client device (602) is connected to the migration server (628). The client device (602) displays notifications and alerts that are generated during the process of identifying that a migration should occur and the process of migrating the application from the first cloud provider service (608) to the second cloud provider service (644). The client device (602) also feeds the budget goals and budget information to the migration server (628).

The second cloud provider service (644) includes the cloud API (650). The second cloud provider service (644) as well as the first cloud provider service (608) are from a plurality of cloud provider services, examples of which include Amazon Web Services (AWS), Google Cloud Platform (GCP), Microsoft Azure, Alibaba Cloud, etc. The first cloud provider service (608) is the initial cloud provider service that runs the application and the second cloud provider service (644) is a targeted cloud provider service to which to migrate the application based on the total cost for running the application.

Prior to migrating the application, the migration service (604) receives performance information, pricing information, and budget information. The performance information is received from the monitoring service (620) from the first cloud provider service (608). The pricing information is pulled from the first cloud API (642) of the first cloud provider service (608) and from the second cloud API (650) of the second cloud provider service (644). The budget information is received from the client device (602).

The machine learning service (612) takes in the performance information, the pricing information, and the budget information, generates input features for each of the machine learning models (640), and generates output vectors from the machine learning models (640) by applying the input features to the machine learning models (640). The migration service (604) receives the output vectors and generates a cost for each of the cloud provider services (608, 644). The migration service (604) determines that the cost for the second cloud provider service (644) is sufficient to migrate the application from the first cloud provider service (608) to the second cloud provider service (644). In one or more embodiments, the migration service (604) compares the cost for the first cloud provider service (608) to the cost for the second cloud provider service (644) and checks the difference between the costs against a threshold. In this example, the threshold is met and the migration service (604) generates migration instructions to migrate the application (616) from the first cloud provider service (608) to the second cloud provider service (644).

Referring to FIG. 6B, the deployment server (606), as instructed by the migration service (604), deploys the application (646) to the second cloud provider service (644) and updates the entry in the domain name server (610) to route traffic to the application (646) on the second cloud provider service (644) instead of to the application (616) on the first cloud provider service (608). In one or more embodiments, traffic is routed to the first cloud provider service (608) and copied to the second cloud provider service (644) to test the application (646) on live data before removing the first application (616) from the first cloud provider service (608). In one or more embodiments, the migration includes replicating a database from the first cloud provider service (608) to the second cloud provider service (644).

Referring to FIG. 6C, the deployment server (606), as instructed by the migration service (604), removes the application from the cloud provider service (608). In one or more embodiments, removal of the application from the cloud provider service (608) includes deleting each of the machine instances (634) from the first cloud provider service. The first cloud provider service can also remove the monitoring service (620) in response to the removal of the programs (626) and the load balancer (618), which were providing the performance information to the monitoring service (620).

In additional or alternative embodiments, certain programs, containers, and machine instances of the application (616) on the first cloud provider service (608) can remain running. As an example, a database program can remain operational on the first cloud provider service (608) while the execution of the application is performed on the second cloud provider service (644) with the second application (646).

Figure 7A:
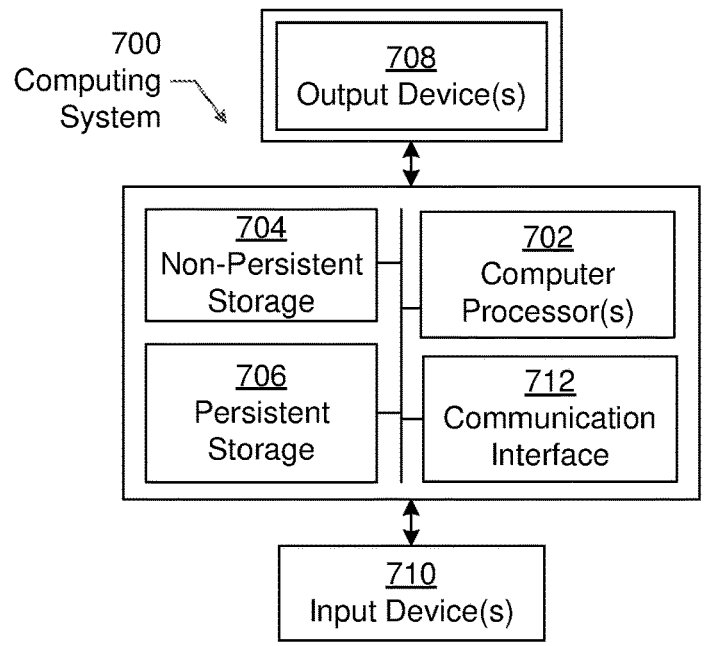
FIG. 7A and FIG. 7B show a computing system in accordance with one or more embodiments of the invention.

For example, a database can be running as a primary in the first cloud provider service (608) and can be running in the second cloud provider service (644) as a read replica or a read-write replica. Analysis using the machine learning service (612) can determine which cloud provider service is running the database as the primary after migration, e.g., switching the primary from the first cloud provider service (608) to the second cloud provider service. Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
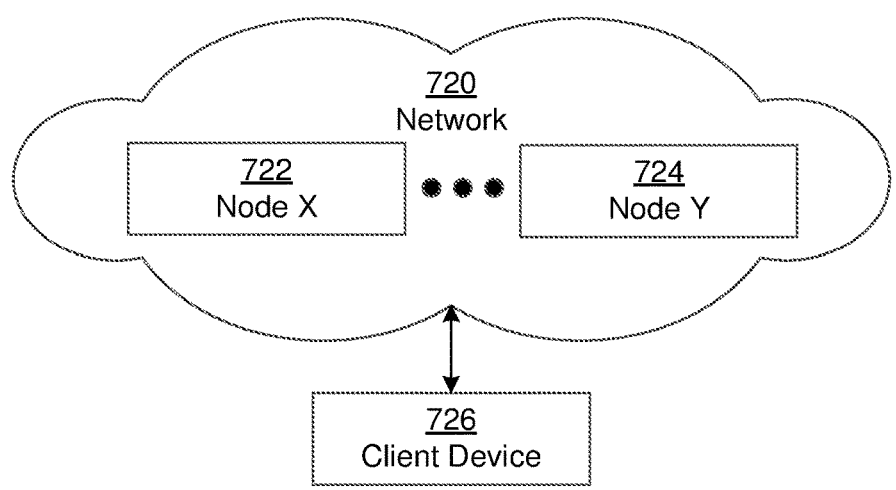

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving budget information of a containerized application deployed with a set of containers to a first cloud provider service of a set of cloud provider services;
receiving a set of pricing information from the set of cloud provider services, wherein the set of cloud provider services includes the first cloud provider service and a second cloud provider service;
receiving performance information of the containerized application from the first cloud provider service;
generating, for the first cloud provider service, a first output vector of a set of output vectors from a first machine learning model of a set of machine learning models,
wherein the first machine learning model uses a first pricing information of the set of pricing information and the performance information to generate the first output vector, and
wherein the first output vector, the first machine learning model, and the first pricing information are associated with the first cloud provider service of the set of cloud provider services;
generating, for the second cloud provider service, a second output vector of the set of output vectors from a second machine learning model of the set of machine learning models,
wherein the second machine learning model uses a second pricing information of the set of pricing information and the performance information to generate the second output vector, and
wherein the second output vector, the second machine learning model, and the second pricing information are associated with the second cloud provider service of the set of cloud provider services;
determining a first cloud provider service cost and a second cloud provider service cost based on the set of output vectors and the set of pricing information; and
migrating the containerized application from the first cloud provider service to the second cloud provider service based on the set of output vectors, the first cloud provider service cost, and the second cloud provider service cost by removing a first container from the first cloud provider service and deploying a second container to the second cloud provider service, wherein the first container and the second container each perform a same function.

2. The method of claim 1 further comprising:
generating a set of input features from one or more of the budget information, the first pricing information, and the performance information, wherein the input features include a pricing percentage, processor usage percentage, a memory usage percentage, a storage usage percentage, a latency percentage, and a traffic percentage,
generating the first output vector by applying the set of input features to a neural network,
wherein the neural network is the first machine learning model,
wherein the neural network includes an input layer with six input nodes, a set of hidden layers, and an output layer with three output nodes that form the first output vector,
wherein a first output node identifies that a first machine instance of a set of machine instances to which the application is deployed is to be swapped to a second machine instance having a lower cost,
wherein a second output node identifies that a configuration of the first machine instance is to be updated,
wherein a third output node identifies that the set of machine instances is to be autoscaled,
wherein the set of hidden layers includes a first hidden layer and a second hidden layer that each include at least five nodes, and
wherein the input layer is fully connected to the first hidden layer, the first hidden layer is fully connected to the second hidden layer, and the second hidden layer is fully connected to the output layer.

3. The method of claim 1 further comprising:
storing the budget information, first pricing information, and performance information as historical information; and
training the first machine learning model with the historical information.

4. The method of claim 1 further comprising:
determining the first cloud provider service cost and the second cloud provider service cost based on the set of output vectors and the set of pricing information by applying the set of pricing information to a first updated configuration and a second updated configuration,
  wherein the first cloud provider service cost and the first updated configuration each correspond to the first cloud provider service, and
  wherein the second cloud provider service cost and the second updated configuration each correspond to the second cloud provider service; and
generating migration instructions by comparing the first cloud provider service cost, the second cloud provider service cost, and a budget goal from the budget information.

5. The method of claim 4 further comprising:
migrating the containerized application by executing the migration instructions, wherein the migration instructions include instructions for:
  deploying a second set of containers to the second cloud provider service to run the containerized application;
  switching a primary database from the first cloud provider service to the second cloud provider service; and
  migrate traffic from the first cloud provider service to the second cloud provider service by updating a domain name system entry in a domain name system.

6. The method of claim 1 further comprising:
receiving the budget information from a client device, wherein the budget information includes a budget goal of the containerized application;
retrieving the set of pricing information by accessing an application program interface of each cloud provider service of the set of cloud provider services,
  wherein the set of pricing information includes a price for each machine instance type from a list of machine instance types from each cloud provider service of the set of cloud provider services,
  wherein each machine instance of the set of machine instances corresponds with a same machine instance type of a first list of machine instance types from the first cloud provider service,
  wherein each machine instance of the set of machine instances hosts a container of the set of containers, and
  wherein each machine instance type of the list of machine instance types identifies a type of virtual machine; and
receiving the performance information from a monitoring service hosted by the first cloud provider service, wherein the performance information includes a processor value, a memory value, a storage value, a latency value, and a traffic value for each container of the set of containers.

7. A system comprising:
a memory coupled to a processor;
a migration service that executes on the processor, uses the memory, and is configured for:
  receiving budget information of a containerized application deployed with a set of containers to a set of machine instances to a first cloud provider service of a set of cloud provider services;
  receiving a set of pricing information from the set of cloud provider services, wherein the set of cloud provider services includes the first cloud provider service and a second cloud provider service;
  receiving performance information of the containerized application from the first cloud provider service;
  generating, for the first cloud provider service, a first output vector of a set of output vectors from a first machine learning model of a set of machine learning models,
    wherein the first machine learning model uses a first pricing information of the set of pricing information and the performance information to generate the first output vector, and
    wherein the first output vector, the first machine learning model, and the first pricing information are associated with the first cloud provider service of the set of cloud provider services;
  generating, for the second cloud provider service, a second output vector of the set of output vectors from a second machine learning model of the set of machine learning models,
    wherein the second machine learning model uses a second pricing information of the set of pricing information and the performance information to generate the second output vector, and
    wherein the second output vector, the second machine learning model, and the second pricing information are associated with the second cloud provider service of the set of cloud provider services; and
  determining a first cloud provider service cost and a second cloud provider service cost based on the set of output vectors and the set of pricing information; and
  migrating the containerized application from the first cloud provider service to the second cloud provider service based on the set of output vectors, the first cloud provider service cost and the second cloud provider service cost by removing a first container from the first cloud provider service and deploying a second container to the second cloud provider service, wherein the first container and the second container each perform a same function.

8. The system of claim 7, wherein the migration service is further configured for:
generating a set of input features from one or more of the budget information, the pricing information, and the performance information, wherein the input features include a pricing percentage, processor usage percentage, a memory usage percentage, a storage usage percentage, a latency percentage, and a traffic percentage,
generating the first output vector by applying the set of input features to a neural network,
  wherein the neural network is the first machine learning model,
  wherein the neural network includes an input layer with six input nodes, a set of hidden layers, and an output layer with three output nodes that form the first output vector,
  wherein a first output node identifies that a first machine instance of a set of machine instances to which the application is deployed is to be swapped to a second machine instance having a lower cost,
wherein a second output node identifies that a configuration of the first machine instance is to be updated,
wherein a third output node identifies that the set of machine instances is to be autoscaled,
wherein the set of hidden layers includes a first hidden layer and a second hidden layer that each include at least five nodes, and
wherein the input layer is fully connected to the first hidden layer, the first hidden layer is fully connected to the second hidden layer, and the second hidden layer is fully connected to the output layer.

9. The system of claim 7, wherein the migration service is further configured for:
storing the budget information, first pricing information, and performance information as historical information; and
training the first machine learning model with the historical information.

10. The system of claim 7, wherein the migration service is further configured for:
determining the first cloud provider service cost and the second cloud provider service cost based on the output vector and the pricing information by applying the pricing information to a first updated configuration and a second updated configuration,
wherein the first cloud provider service cost and the first updated configuration each correspond to the first cloud provider service, and
wherein the second cloud provider service cost and the second updated configuration each correspond to the second cloud provider service; and
generating migration instructions by comparing the first cloud provider service cost, the second cloud provider service cost, and a budget goal from the budget information.

11. The system of claim 10, wherein the migration service is further configured for:
migrating the containerized application by executing the migration instructions, wherein the migration instructions include instructions for:
deploying a second set of containers to the second cloud provider service to run the containerized application;
switching a primary database from the first cloud provider service to the second cloud provider service; and
migrate traffic from the first cloud provider service to the second cloud provider service by updating a domain name system entry in a domain name system.

12. The system of claim 7, wherein the migration service is further configured for:
receiving the budget information from a client device, wherein the budget information includes a budget goal of the containerized application;
retrieving the set of pricing information by accessing an application program interface of each cloud provider service of the set of cloud provider services,
wherein the set of pricing information includes a price for each machine instance type from a list of machine instance types from each cloud provider service of the set of cloud provider services,
wherein each machine instance of the set of machine instances corresponds with a same machine instance type of a first list of machine instance types from the first cloud provider service,
wherein each machine instance of the set of machine instances hosts a container of the set of containers, and
wherein each machine instance type of the list of machine instance types identifies a type of virtual machine; and
receiving the performance information from a monitoring service hosted by the first cloud provider service, wherein the performance information includes a processor value, a memory value, a storage value, a latency value, and a traffic value for each container of the set of containers.

13. A non-transitory computer readable medium comprising computer readable program code for:
receiving budget information of a containerized application deployed with a set of containers to a first cloud provider service of a set of cloud provider services;
receiving a set of pricing information from the set of cloud provider services, wherein the set of cloud provider services includes the first cloud provider service and a second cloud provider service;
receiving performance information of the containerized application from the first cloud provider service;
generating, for the first cloud provider service, a first output vector of a set of output vectors from a first machine learning model of a set of machine learning models, wherein the first machine learning model uses a first pricing information of the set of pricing information and the performance information to generate the first output vector, and
wherein the first output vector, the first machine learning model, and the first pricing information are associated with the first cloud provider service of the set of cloud provider services;
generating, for the second cloud provider service, a second output vector of the set of output vectors from a second machine learning model of the set of machine learning models,
wherein the second machine learning model uses a second pricing information of the set of pricing information and the performance information to generate the second output vector, and
wherein the second output vector, the second machine learning model, and the second pricing information are associated with the second cloud provider service of the set of cloud provider services;
determining a first cloud provider service cost and a second cloud provider service cost based on the set of output vectors and the set of pricing information; and
migrating the containerized application from the first cloud provider service to the second cloud provider service based on the set of output vectors, the first cloud provider service cost, and the second cloud provider service cost by removing a first container from the first cloud provider service and deploying a second container to the second cloud provider service, wherein the first container and the second container each perform a same function.

14. The non-transitory computer readable medium of claim 13, further comprising computer readable program code for:
generating a set of input features from one or more of the budget information, the first pricing information, and the performance information, wherein the input features include a pricing percentage, processor usage percentage, a memory usage percentage, a storage usage percentage, a latency percentage, and a traffic percentage, generating the first output vector by applying the set of input features to a neural network,
  wherein the neural network is the first machine learning model,
  wherein the neural network includes an input layer with six input nodes, a set of hidden layers, and an output layer with three output nodes that form the output vector,
  wherein a first output node identifies that a first machine instance of a set of machine instances to which the application is deployed is to be swapped to a second machine instance having a lower cost,
  wherein a second output node identifies that a configuration of the first machine instance is to be updated,
  wherein a third output node identifies that the set of machine instances is to be autoscaled,
  wherein the set of hidden layers includes a first hidden layer and a second hidden layer that each include at least five nodes, and
  wherein the input layer is fully connected to the first hidden layer, the first hidden layer is fully connected to the second hidden layer, and the second hidden layer is fully connected to the output layer.

15. The non-transitory computer readable medium of claim 13, further comprising computer readable program code for:
  storing the budget information, first pricing information, and performance information as historical information; and
  training the first machine learning model with the historical information.

16. The non-transitory computer readable medium of claim 13, further comprising computer readable program code for:
  determining the first cloud provider service cost and the second cloud provider service cost based on the set of output vectors and the set of pricing information by applying the set of pricing information to a first updated configuration and a second updated configuration,
    wherein the first cloud provider service cost and the first updated configuration each correspond to the first cloud provider service, and
    wherein the second cloud provider service cost and the second updated configuration each correspond to the second cloud provider service;
  generating migration instructions by comparing the first cloud provider service cost, the second cloud provider service cost, and a budget goal from the budget information; and
  migrating the containerized application by executing the migration instructions, wherein the migration instructions include instructions for:
    deploying a second set of containers to the second cloud provider service to run the containerized application;
    switching a primary database from the first cloud provider service to the second cloud provider service; and
    migrate traffic from the first cloud provider service to the second cloud provider service by updating a domain name system entry in a domain name system.

17. The non-transitory computer readable medium of claim 13, further comprising computer readable program code for:
  receiving the budget information from a client device, wherein the budget information includes a budget goal of the containerized application;
  retrieving the set of pricing information by accessing an application program interface of each cloud provider service of the set of cloud provider services,
    wherein the set of pricing information includes a price for each machine instance type from a list of machine instance types from each cloud provider service of the set of cloud provider services,
    wherein each machine instance of the set of machine instances corresponds with a same machine instance type of a first list of machine instance types from the first cloud provider service,
    wherein each machine instance of the set of machine instances hosts a container of the set of containers, and
    wherein each machine instance type of the list of machine instance types identifies a type of virtual machine; and
  receiving the performance information from a monitoring service hosted by the first cloud provider service, wherein the performance information includes a processor value, a memory value, a storage value, a latency value, and a traffic value for each container of the set of containers.

* * * * *

UNITED STATES PATENT AND TRADEMARK OFFICE
CERTIFICATE OF CORRECTION

PATENT NO. : 10,789,089 B2
APPLICATION NO. : 16/130131
DATED : September 29, 2020
INVENTOR(S) : Ravi Hari Page 1 of 1

It is certified that error appears in the above-identified patent and that said Letters Patent is hereby corrected as shown below:

In the Claims

Claim 5, Column 23, Line 33, the word "migrate" should read -- migrating --.

Claim 11, Column 25, Line 49, the word "migrate" should read -- migrating --.

Claim 16, Column 28, Line 14, the word "migrate" should read -- migrating --.

Signed and Sealed this
Fifteenth Day of December, 2020

Andrei Iancu
*Director of the United States Patent and Trademark Office*